(12) United States Patent
Adam et al.

(10) Patent No.: US 8,373,305 B2
(45) Date of Patent: Feb. 12, 2013

(54) HYBRID INSTALLATION WITH A BIOGAS INSTALLATION

(75) Inventors: Dirk Adam, Hamburg (DE); Hans-Peter Schumacher, Bad Bramstedt (DE)

(73) Assignee: Natcon7 GmbH, Hamburg (DE)

( * ) Notice: Subject to any disclaimer, the term of this patent is extended or adjusted under 35 U.S.C. 154(b) by 632 days.

(21) Appl. No.: 12/594,306

(22) PCT Filed: Mar. 28, 2008

(86) PCT No.: PCT/EP2008/002496
§ 371 (c)(1),
(2), (4) Date: Feb. 5, 2010

(87) PCT Pub. No.: WO2008/119516
PCT Pub. Date: Oct. 9, 2008

(65) Prior Publication Data
US 2010/0148585 A1    Jun. 17, 2010

(30) Foreign Application Priority Data
Apr. 2, 2007    (DE) .......................... 10 2007 016 281

(51) Int. Cl.
*H02J 1/10* (2006.01)
(52) U.S. Cl. ......................................................... 307/43
(58) Field of Classification Search ...................... 307/43
See application file for complete search history.

(56) References Cited

U.S. PATENT DOCUMENTS

| | | | |
|---|---|---|---|
| 4,750,454 A | 6/1988 | Santina et al. | |
| 6,663,777 B2 | 12/2003 | Schimel | |
| 2008/0195255 A1* | 8/2008 | Lutze et al. | 700/291 |

FOREIGN PATENT DOCUMENTS

| | | |
|---|---|---|
| DE | 3715952 A1 | 11/1988 |
| DE | 20220621 U1 | 12/2003 |
| DE | 102004046701 A1 | 4/2006 |
| DE | 102004062993 A1 | 7/2006 |
| EP | 0822251 A2 | 2/1998 |
| EP | 1 739 824 A2 | 3/2007 |
| JP | 2006029087 A | 2/2006 |
| WO | 2005/061135 A1 | 7/2005 |

OTHER PUBLICATIONS

Vermont Methane Pilot Project Initial Literature Search Paper; Vermont Department of Agriculture, Food and Markets, Vermont Department of Public Service. Apr. 22, 1999.
"Energieoptimierung an der Verbandsklaranlage Hallstattersee," by Hansjorg Schenner.
"Wind-, Solar-und Biogasanlage in Burg auf Fehmarn," by Gunter Dorge, Horneburg.

* cited by examiner

*Primary Examiner* — Hal Kaplan
(74) *Attorney, Agent, or Firm* — Vidas, Arrett & Steinkraus P.A.

(57) ABSTRACT

A hybrid installation for providing electric energy from regenerative energy sources, comprising a biogas installation that provides electric energy, and at least one additional energy converter, which provides electric energy and whose releasable power is depending of external influence factors, of the wind supply and/or the sun irradiation in particular, wherein the electric energy of the biogas installation and the electric energy of the at least one additional energy converter are fed into a common mains grid, characterized in that the biogas installation features a gas turbine with an electric generator which is operated by the biogas produced in the biogas installation, and whose waste heat can be supplied to the biogas installation via a heat exchanger.

23 Claims, 2 Drawing Sheets

HYBRID INSTALLATION WITH A BIOGAS INSTALLATION

CROSS-REFERENCE TO RELATED APPLICATIONS

Not applicable

STATEMENT REGARDING FEDERALLY SPONSORED RESEARCH

Not applicable

BACKGROUND OF THE INVENTION

The present invention is related to a hybrid installation for providing electric energy from regenerative energy sources, which features a biogas installation that provides electric energy, and at least one additional energy converter, which provides electric energy and whose releasable power is depending of external influence factors, of the wind supply and/or the sun irradiation in particular, wherein the electric energy of the biogas installation and the electric energy of the at least one additional energy converter are fed into a common mains grid.

Biogas installations have a so-called digester, in which biomass containing waste materials, like sewage sludge, biological waste or food leftovers, liquid manure, solid dung, wood chips or even purposefully grown energy plants like for instance maize, cereals and grass are transformed in a multi-stage process. In doing so, biogas is generated, whose essential energy-rich constituent is methane. In a block-type thermal power station for instance, the biogas can be used for driving an internal combustion engine which drives a generator. The provided electric energy can be fed into a mains grid, whereas the waste heat of the internal combustion engine can be used for heating a building. Due to the combustion process used for driving the generator, electric energy and heat are always generated at the same time in the operation of a biogas installation, in particular, it is not possible to provide electric energy without generating heat at the same time. The thermal and the electric power of a biogas installation can be released at any time, up to maximum value determined by the dimension of the installation. Provided that there is sufficient biogas, the power of the installation can be increased up to its maximum value within a short time by controlling the internal combustion engine.

Other known energy converters can provide electric energy directly without that a noteworthy waste heat is generated. Among these are wind energy- and photovoltaic installations in particular. However, the availability of the provided electric energy of such energy converters depends of external influence factors, in the cited examples from the wind supply or the sun irradiation, respectively. Depending on circumstances, not any at all or only a fraction of the rated power of such installations can be released for longer periods of time.

Hybrid installations for providing electric energy from regenerative energy sources combine different energy converters. One such biogas installation is known from the German patent application DE 10 2004 046 701 A1. It is denoted as a regenerative energy system and combines a wind energy installation generating electric energy and feeding it into a mains grid with an internal combustion engine that is operated by a fuel made from renewable raw material, like rapeseed oil for instance. The internal combustion engine drives a generator, and by doing so it produces electric energy, which is also fed into the mains grid. The known hybrid installation is essentially intended for supplying isolated systems. In this, the internal combustion engine operated with rapeseed oil substitutes a conventionally driven diesel generator and through this it may improve the environmental compliance. In one embodiment, it is conceived to operate the internal combustion engine with biogas. The heat generated in the operation of the internal combustion engine is not exploited in the known hybrid installation.

From the article "Energieoptimierung an der Verbandskläranlage Hallstättersee" by Hansjörg Schenner, published in the journal "Ökoprojekt Das Fachmagazin für Umweltförderung", Vol. 1/2006, a waste water treatment installation for purifying waste waters is known that has a large energy demand. In order to cover this energy demand, the biogas generated in the digestion tower of the waste water treatment installation is converted into electric energy with the aid of two micro-turbines on the one hand, and on the other hand, a photovoltaic installation additionally feeds electric energy into the internal electric grid of the waste water treatment installation. The thermal energy produced in the operation of the micro-turbines is integrated into the heat grid of the waste water treatment installation, and is used for heating the installations. Alternatively, the electric energy generated by the micro-turbines can be fed into the public mains as ecological current.

From the document EP 0 822 251 A2, an apparatus for producing biogas with a digester is known. The produced biogas is used to power a block-type thermal power station. The waste heat of the gas engine operated in the block-type thermal power station is supplied to a heat consumer and serves also for heating the digester.

From the document WO 2005/061135 A1, an energy system is known for supplying a plant that processes milk or fish, for instance. The system comprises a biogas installation and a combined energy converter, a Stirling motor for instance, which provides heat and electric energy. The heat is supplied to a hot water tank, and from the same it may be extracted again, for instance in order to heat the biogas installation or a stable for animals, for instance. The electric energy is used for the continuous production of ice in a cooling installation. The ice serves for cooling the products to be processed, the milk or the fish for instance. Additionally required electric energy can be extracted from a grid. It is also conceived to use a fuel cell or a wind energy installation in addition.

From the document DE 10 2004 062 993 A1, a biogas installation is known that features a digester and other functional elements housed in a container, a block-type thermal power station for instance. The biogas installation may feature an electrically powered bottling plant for the produced biogas. In this it is also conceived to use a photovoltaic system to power the electric bottling plant.

From the article "Wind-, Solar- and Biogasanlage in Burg auf Fehmarn" by Günter Dörge, published in "de/der Elektromeister+deutsches Elektrohandwerk", Vol. 24/90, page 1883-1888, a hybrid installation is known which features a biogas installation with a block-type thermal power station operated with the biogas, a wind energy installation and a solar generator. The hybrid system is situated on the location of a waste water treatment facility, which covers its basic electric load from a public electric mains grid and is in addition powered by the hybrid system. A common operation management system controls the elements of the hybrid system and can cut off or connect individual consumers of the waste water treatment facility, like aerators and pumps, depending on the produced electric power. In case that the electric energy produced by sun, wind and biogas exceeds the own demand of the waste water treatment facility in spite of this adjustment of the demanded power, the excess is supplied into the public mains grid.

Starting from this, it is the objective of the present invention to provide a hybrid installation of the kind mentioned in the beginning, which utilises the applied energy sources more efficiently.

BRIEF SUMMARY OF THE INVENTION

The hybrid installation according to the present invention serves for providing electric energy from regenerative energy sources, and it has a biogas installation that provides electric energy, and at least one additional energy converter which provides electric energy and whose releasable power is depending of external influence factors, of the wind supply and/or the sun irradiation in particular, wherein the electric energy of the biogas installation and the electric energy of the at least one additional energy converter are fed into a common mains grid, wherein the biogas installation features a gas turbine with an electric generator which is operated by the biogas produced in the biogas installation, and whose waste heat can be supplied to the biogas installation via a heat exchanger. The dependence of the releasable power of the at least one additional energy converter may also be related to the availability of other, ultimately solar fuels, in geothermic installations or water power stations for example. The gas turbine is distinguished by a higher efficiency factor than a conventional internal combustion engine. Through this, a higher amount of electric energy can be produced from the same amount of biogas. The amount of heat that is liberated in the combustion of a certain amount of biogas is correspondingly reduced. However, this heat is not lost without being used, but can be supplied to the biogas installation via a heat exchanger. Thereby the biogas installation can be heated up to a temperature that is favourable for the production of biogas. Preferably, the heat liberated by the gas turbine is extracted from the exhaust gas by a heat exchanger, and supplied to the digester of the biogas installation via a further heat exchanger.

The mains grid can be a public electricity grid and/or an isolated system. In the case of an isolated system, the hybrid installation of the present invention allows an autonomous supply, which is an alternative to the connection to the public mains grid and which makes sense for far-away agricultural enterprises, for instance.

In one embodiment of the invention, the biogas installation features a gas tank for storing biogas. Thereby, a sufficient hoard of biogas can be kept in stock, in order to be able to operate the biogas installation for a certain period of time even at insufficient biogas production, for instance due to maintenance works or to raw materials shortage. Moreover, the biogas production can be continued on a uniform, favourable level even at fluctuating power of the gas turbine through the buffer action of the gas tank.

In a further embodiment of the invention, the gas turbine is a micro gas turbine having an electric power of 100 kW or less. Micro gas turbines are especially optimised for the mentioned, relatively low power range and have a high efficiency. Therefore, a hybrid installation having a high efficiency factor can be offered in a relatively low power range that is sufficient for many applications. A further advantage is that such micro gas turbines can be operated with unprocessed, in particular with not desulphurised biogas. An example for a micro gas turbine is known from DE 202 20 621 U1.

In a further embodiment of the invention, the overall electric power of the at least one additional energy converter is at maximum 50% of the electric power of the gas turbine. The overall electric power is related to the electric power of all the connected additional energy converters. Thereby, the overall electric power provided by the hybrid installation can be kept constant even at strongly fluctuating power of the at least one additional energy converter. In particular, the gas turbine can be operated at a working point which permits a fast regulation of power fluctuations of the at least one additional energy converter. At the same time, the gas turbine can be operated in a power range that is favourable with respect to the efficiency factor.

In one embodiment of the invention, one of the at least one additional energy converters is a wind energy installation. Also preferred is to use a photovoltaic installation. Both variants are proven robust energy converters, which can provide electric energy directly.

In a further embodiment of the invention, several additional energy converters are provided which use different regenerative energy sources. By combining different regenerative energy sources for providing electric energy with a biogas installation, power fluctuations of the individual energy sources can be partly compensated. Moreover, the available supply of energy, for instance in the form of solar- or wind energy, is exploited better. The combination of different energy sources offers also an increased operation safety in the case of technically caused breakdowns of individual energy converters.

According to one embodiment of the invention, the additional energy converters are connected to a common DC circuit or to a common AC circuit. If only energy converters are combined which supply a DC voltage as such, the same are connected to a common DC circuit. If only energy converters are combined which supply an AC voltage as such, the same are connected to a common AC circuit. If energy converters that supply a DC voltage are combined with energy converters that supply an AC voltage, the supplied AC voltage can be converted into a DC voltage with a suitable grid connection device. Alternatively, the energy converters that supply an DC voltage can be combined with an DC to AC inverter which converts the DC voltage into an AC voltage. Grid connection devices are essentially made up of a rectifier and a filter element, and when they are fed by AC voltage they provide a DC current having only a small residual ripple. Such grid connection devices are known from devices and installations which are fed by AC current from the mains. They can be built for different ranges of voltage and current. An advantage of using grid connection devices is their robustness against load fluctuations and fluctuations of the input voltage of up to +/−10% for instance. When the additional energy converters are connected to a common DC circuit, all the energy converters that supply a DC voltage as such are equipped with a protection against undesired feedbacks from the DC circuit.

In one embodiment of the invention, the common DC circuit or the common AC circuit, respectively, are connected to an electric energy storage device. The electric energy storage device can provide electric energy either directly or by energy conversion from a thermal, chemical or mechanical energy storage device. For instance, providing electric energy directly can be accomplished via a capacitor battery, whereas providing electric energy from thermal energy by energy conversion can take place from a heat accumulator, for instance. Providing electric energy from chemical energy can be accomplished via an accumulator, a battery, a galvanic cell or a redox-flow cell. Providing electric energy from mechanical energy can be accomplished either from kinetic energy via a flywheel, or from potential energy via a spring, a pump-fed power station, a pressurised air fed power station, a gas-fed power station or via a weight. The stored energy can be used for compensating power fluctuations of the additional energy converters in the DC or AC circuit, and thereby perpetuate continuously the energy flow that is directly provided by the additional energy converters. Moreover, the stored energy can be used for starting the hybrid installation after an operation break again, independently from an external mains power. For this purpose, it might be necessary to start auxiliary drives of the biogas installation, of the gas turbine or of the additional energy converters again or to traverse or track them into a certain working position. Besides to that, the voltage supply for the complete monitoring, control and regulation of the hybrid installation during an operation break can be made safe via the energy storage device. Through the electric energy from the energy storage device, which is adapted to be connected even over a longer period of time on demand, the hybrid installation is equipped with an additional, adjustable energy source.

In a further embodiment of the invention, an inverter converts electric energy from the common DC circuit into AC voltage and feeds it into the mains grid. The power fed into the mains grid can be controlled by the inverter. Furthermore, the electric energy provided by different energy converters can be adapted to the conditions of the respective mains grid.

In a further embodiment of the invention, the electric energy from the common DC circuit is fed into the mains grid via a transformer. As the case may be, after converting it into AC voltage with the aid of an inverter, the energy extracted from a common DC circuit can be combined with a transformer in order to feed it into the mains grid.

According to a further embodiment of the invention, the heat exchanger is connected to a heat accumulator via a first thermal transfer fluid circuit. Heat liberated in the operation of the gas turbine can be intermediately stored by way of the heat accumulator. According to the demand of the biogas production process, the heat can be extracted from the heat accumulator then when it is needed.

In a further embodiment of the invention, the heat of the heat accumulator can be extracted via a second thermal transfer fluid circuit. Thereby, even that thermal energy which cannot be used for the operation of the biogas installation can be used in a way that makes sense. In particular, a building like a dwelling or a stable can be provided with heat. The used energy resources are utilised even more efficiently through this. The extracted heat can also be used for cooling buildings, in the summer months for instance, with the aid of a suitable cooling installation, e.g. an adsorption refrigeration installation or a heat pump. It is also possible to extract the excess heat not from the heat accumulator, but directly from the first thermal transfer fluid circuit with the aid of a further heat exchanger.

According to a further embodiment of the invention, the biogas installation features a digester, which is equipped with a heating circle that can be connected with the first thermal transfer fluid circuit via a valve arrangement. Via the heating circle, the digester can be supplied with the heat that is stored in the heat accumulator. Through the connection via a valve arrangement, an additional heat exchanger and a separate circulation pump for the heating circle can be omitted. Instead, the first thermal transfer fluid circuit and the heating circle are directly connectable. Besides to the simplified construction, an utilisation of the heat with less loss can also be achieved.

In a further embodiment of the invention, the heat accumulator features a heater element, which can be operated with electric energy from the at least one additional energy converter. Thereby, the excess electric energy from one or several of the additional energy converters can be transformed into heat and be supplied to the heat accumulator. This solution is particularly advantageous in the case that the additional energy converters generate more electric energy than is needed by the consumers connected to the mains grid. In case that the electric energy cannot be stored otherwise, like in the energy storage device, the additional energy converters would have to be cut off, should the situation arise. However, this is unfavourable, because it brings the hybrid installation into an unfavourable working position for the overall operation and because it necessitates a comparably sumptuous operation management. Moreover, for instance in the case of a wind energy installation, the mechanical stress on the components of the wind energy installation can be increased compared with a uniform operation. As an alternative to cutting off, it is known to transform the excess electric energy into heat and to lead it into the ground. However, a sumptuous apparatus is necessary for this, and the excess energy is lost for later utilisation. With the heater element that can be connected even for a longer period of time if need be, the hybrid installation is equipped with an additional adjustable consumer.

In a further embodiment of the invention, a control element is provided, which controls the gas turbine in dependence of an internally or externally given desired value for the electric power of the hybrid installation and/or in dependence of an additional internally or externally given desired value for the thermal power of the hybrid installation. The two desired values can be set on the basis of the demanded electric and/or thermal power. By the control of the gas turbine, the hybrid installation can provide a constant electric power for instance, wherein power fluctuations of the additional energy converters are compensated through the control element of the gas turbine. If the situation arises, the control element of the gas turbine may intervene only then when the energy fluctuations of the additional energy converters cannot be compensated or can not be compensated completely by connection of the heater element. It is also possible to preset a desired value for the thermal power of the hybrid installation, and to have a certain amount of heat always at disposal by doing so. Presetting a desired value for the electric or the thermal power is known in the domain of block-type thermal power stations, which are accordingly designated as thermally controlled or as current controlled block-type thermal power stations. However, in these known installations, desired values for the electric power and such ones for the thermal power cannot be given independently from each other. According to the present invention, this is possible, because providing the electric energy is uncoupled from providing the thermal energy within certain limits. Thus, there arise new possibilities for a control of the hybrid installation according to demand.

In a further embodiment of the invention, the control element acquires the electric power of the generator of the gas turbine and/or the electric power of each one of the at least one additional energy converters and/or the thermal power extracted from the heat accumulator. If the situation arises, the electric power fed into the mains grid can be acquired in addition. The capture of the mentioned data forms the basis for the control of the gas turbine. It is also possible to acquire the electric power fed into the electric mains grid by an inverter or a transformer, and/or the electric power taken up or given off by the energy storage device, and/or the electric power taken up by the heater element.

According to a further embodiment, the control element controls the electric power of one of the at least one additional energy converters. By doing so, the electric power provided by the additional energy converter can be purposefully influenced in addition to the control of the gas turbine. This is possible for instance in correspondingly controllable wind energy installations, whose power can be decreased for instance on behalf of a smaller noise emission. According to the location of the wind energy installation, this may be advantageous during the night silence period in particular. Another motivation for decreasing the power can result from a decreased demand for electric energy. It is also envisioned that the control element controls the power of the heater element. Thereby a certain electric power can be purposefully transformed into heat.

In a further embodiment of the invention, the at least one additional energy converter and/or the biogas installation can be upgraded in a modular way. The upgrade may consist in the supplementation of further solar modules, of a further wind energy installation or even of an additional gas turbine for the biogas installation. Thereby the hybrid installation can be flexibly adapted to a changing demand of electric energy and/or thermal power. Preferably, the hybrid installation is also prepared for the supplementation of further modules, for instance by correspondingly greater dimensions of the electric connections.

In a further embodiment of the invention, a gas treatment installation is provided, and treated biogas is fed into a mains grid for gas. The gas treatment installation may perform a desulphurisation or drying of the generated biogas, e.g. The mains grid for gas can be a pipeline grid, to which a plurality of gas consumers is connected. However, it is also possible that the biogas is at first intermediately stored in a gas tank, and is transported to a safe location via truck or ship, where the treated biogas is fed into a pipeline grid. In this way, the generated and treated biogas is also made available for a plurality of consumers. Thereby, even a greater amount of biogas can be used than is locally needed in a manner that makes sense. Just in greater agricultural establishments, too great amounts of biomass are often available, so that the biogas produced from it cannot be completely exploited for the agricultural establishment.

According to an embodiment of the invention, only a part of the produced biogas is utilised as a fuel for the gas turbine, wherein this part is dimensioned such that the electric and/or thermal energy provided by the hybrid installation is sufficient for the autonomous operation of the gas treatment installation. In this embodiment, the hybrid installation of the present invention serves mainly for the production and treatment of biogas for feeding it into a gas mains grid. Only the energy needed for the operation of the gas treatment installation is provided by the hybrid installation. Depending of the proportion of the electric energy provided by the additional energy converters, only a small amount of the produced biogas is used as a fuel.

According to a further embodiment of the invention, the biogas installation provides substantially more biogas than is needed for the autonomous operation of the gas treatment installation. In order to increase the amount of biogas produced, either the digester can be dimensioned to be substantially greater than is necessary for the operation of the gas turbine. Or the utilisation of additional digesters is also possible, whose biogas is supplied only to the gas treatment installation. Furthermore, the amount of the produced biogas can also be significantly increased in that an energy rich co-substrate is added to the biomass, for instance in the form of energy-rich plants like maize.

In a further embodiment of the invention, gas in a fuel- or thermal equivalent to the biogas that is fed is extracted from the gas mains grid at an arbitrary other location, and is supplied to a gas turbine or an internal combustion engine or to a gas extraction station there. Thereby the energy contained in the fed biogas can be exploited at any arbitrary other location by extracting an energy equivalent amount of gas from the mains grid.

In one embodiment of the invention, the biogas installation features a fixed film digester. The fixed film digester may have a volume of for instance less than 200 m³ or less than 150 m³. Preferably, mainly liquid manure is reacted in the fixed-film digester. Fixed film digesters are particularly suited for the exploitation of liquid manure and can process for instance the amount of liquid manure that arises in a livestock amount of about 900 to 1000 feeding pigs or 180 feeding cattle. Thus, the utilisation of a fixed film digester is ideal for agricultural establishments of medium size. These can use greater biogas installations to full capacity often only by additional exploitation of renewable raw materials like maize or cereals, which is capital-intensive however. A fixed film digester is distinguished by a high efficiency, because it is small in construction with high methane gas reaction, and does not need energy supply for driving a stirring equipment.

BRIEF DESCRIPTION OF THE SEVERAL VIEWS OF THE DRAWINGS

The present invention is explained in more detail in the following by means of examples of its realisation depicted in figures. They show.

DETAILED DESCRIPTION OF THE INVENTION

Figure 1:
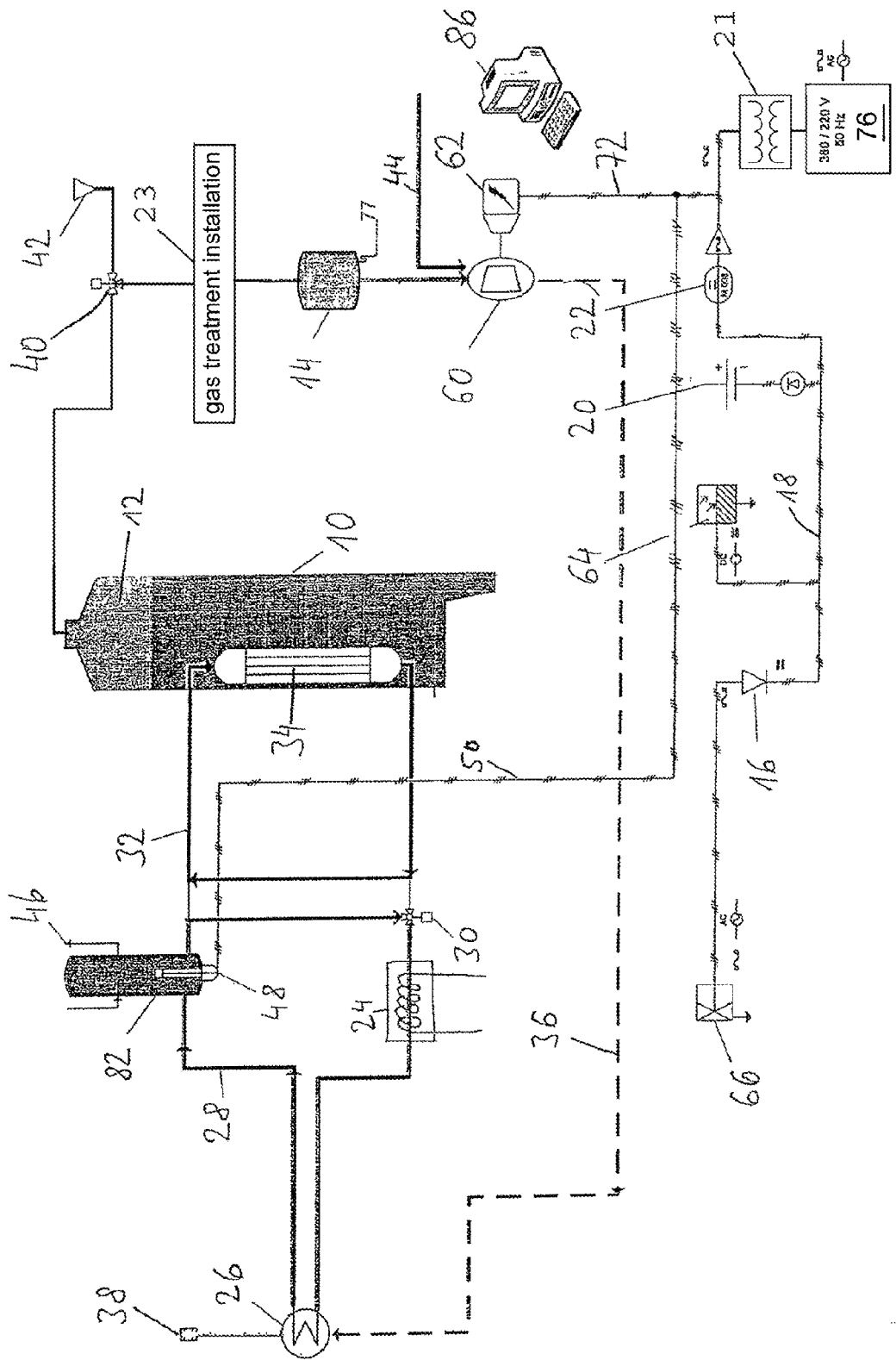
FIG. 1 a hybrid installation of the present invention in a very simplified, schematic representation, FIG. 2 a simplified block diagram regarding the control of the hybrid installation from FIG. 1, FIG. 3 another simplified block diagram regarding the control of another hybrid installation according to the present invention.

FIG. 1 shows a hybrid installation with a digester 10, in which biogas is produced from waste materials and which accumulates in the upper region 12 of the digester 10. The biogas arrives in a gas tank 14 via a pipeline system. Subsequent treatment steps of the biogas, like desulphurisation, compression or drying of the gas e.g., are handled by a gas treatment istallation 23.

From the gas tank 14, the biogas reaches a micro gas turbine 60, which is driven by the combustion of the biogas. The arrow 44 also leading to the micro gas turbine 60 indicates the fresh air supply for the combustion process. Via a shaft, the micro gas turbine 60 is connected to a generator 62, which can provide an electric power of preferably 100 kW or less.

The electric power provided by the generator 62 is fed into a mains grid 76 via a line 72. The mains grid 76 powers several not shown electric consumers and does not have a connection to the grid of an electricity company. As an alternative to this so-called isolated operation of the mains grid 76, the electric energy provided by the hybrid installation can also be fed into a public grid. Via a line 36, the exhaust gases produced in the combustion process of the biogas are supplied from the micro gas turbine 60 to a heat exchanger 26. In the heat exchanger 26, the heat of the exhaust gas is taken up by the thermal transfer fluid of a first thermal transfer fluid circuit 28. In the shown realisation example, water serves as a thermal transfer fluid. From an exit of the heat exchanger 26, the exhaust gases are given off into the air of the surroundings via an exhaust installation 38. The first thermal transfer fluid circuit 28 transports the heat extracted from the exhaust gas into a heat accumulator 82, which is formed by a water tank in the shown realisation example.

Via a valve arrangement 30, it is possible to connect the first thermal transfer fluid circuit 28 with a heating circle 32, which flows through a second heat exchanger 34 situated in the interior of the digester 10. In this way, the heat extracted from the exhaust gas can be supplied to the biogas production process inside the digester 10. In this, the valve arrangement is preferably controlled such that a constant temperature is established in the digester 10, depending on the dimensions of the process equipment.

The hybrid installation of FIG. 1 has a wind energy installation 66 and a photovoltaic installation 64 as additional energy converters. The wind energy installation 66 generates an AC current, which is converted to DC current with the aid of a rectifier 16. The wind energy installation is connected to a DC circuit 18 via the rectifier 16. The photovoltaic installation 64 provides directly a DC voltage, which is also supplied to the DC circuit 18. In order to stabilise the DC voltage, the DC circuit 18 is additionally connected to an accumulator 20, which accumulates electric energy. The electric energy accumulated in the accumulator 20 can also be used for starting the hybrid installation after an operation break (blackstart). The DC circuit 18 is connected to the mains grid 76 via an inverter 22. Via the "loop way" of the DC circuit 18, the electric energy of the different energy converters 64 and 66 can be supplied to the mains grid 76 via a common inverter 22. A transformer 21 may also be in the circuit before the mains grid 76.

The line which transports the biogas from the digester 10 to the gas tank 14 is provided with an additional valve arrangement 40, via which excess biogas that cannot be taken up by the gas tank 14 nor sent to mains grid for gas 77 nor be exploited by the micro gas turbine 60 is supplied to a flame head 42 where it can be combusted. By burning off the biogas, which consists essentially of methane, the environmental compliance with respect to releasing the methane into the atmosphere is significantly improved.

The heat stored in the heat accumulator 82 can not only be used for heating the digester 10, but also for other purposes via a second thermal transfer fluid circuit 46 that is only foreshadowed in the figure. For instance, an agricultural establishment equipped with the hybrid installation can be supplied with sufficient thermal energy, which can be used for heating as well as for cooling, provided that there is a suitable refrigerating machine.

As an alternative, required thermal energy can also be extracted from the first thermal transfer fluid circuit 28 directly, via a further heat exchanger 24. In the realisation example, this energy extraction serves for the operation of a refrigerating machine for air-conditioning agricultural service rooms.

Via an electric line 50, the line 72 to the mains grid 76 is connected to a heater element 48, which is set into the heat accumulator 82. The heater element 48 is operated by the electric energy of the additional energy converters 64 and 66. Thereby, the water existing in the heat accumulator 82 can be heated further. Thus, electric energy provided by the additional energy converters 64, 66 can be exploited even then when there is no demand for electric energy in the mains grid 46 and the electric storage device 20 is already filled.

Figure 2:
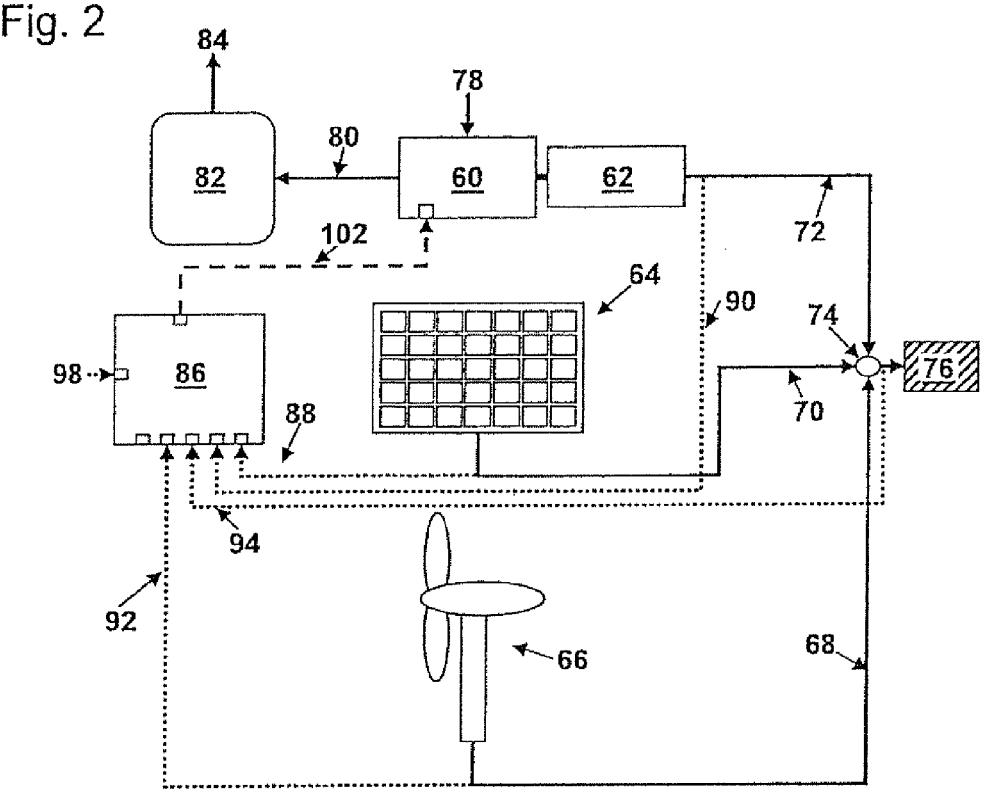

The control of the hybrid installation from FIG. 1 is depicted in a schematic and strongly simplified manner in the block diagram of FIG. 2. Via an electric line 72, the generator 62 is connected to a nodal point 74. Also via an electric line 70, the nodal point 74 is connected to the photovoltaic installation 64, and via an electric line 68 to the wind energy installation 66. The electric energy is fed into the mains grid 76 via the nodal point 74. Also schematically adumbrated is the heat transfer from the micro gas turbine 60, which is supplied with biogas 78, via a line 80 to the heat accumulator 82, from which a consumer 84 is supplied with thermal energy.

Via the connections depicted in dotted lines, the control element 86 acquires the following variables: via the connection 88 the electric power provided by the photovoltaic installation 64, via the connection 90 the electric power provided by the generator 62, via the connection 92 the electric power provided by the wind energy installation 60, and via the connection 94 the overall electric power that is fed into the mains grid 76. The control element 86 analyses the captured data and compares the provided electric power with an externally or internally given desired value 98, which describes the electric power that is demanded in the mains grid 76. When the control element 86 detects a deviation from the desired value, a control command is given to the micro gas turbine 60 via the control connection 102 depicted in dashed lines, whose power is subsequently adjusted such that the overall provided electric power corresponds to the desired value 98. In this way, the demanded electric power can always be provided, even in case that the electric power of the photovoltaic installation 64 or that of the wind energy installation 66 fluctuates strongly due to external influences. By the mentioned kind of control, the electric power of the additional energy converters 64, 66 is given priority with respect to the biogas installation, so that a combustion of the biogas takes place only in the necessary extent.

Figure 3:
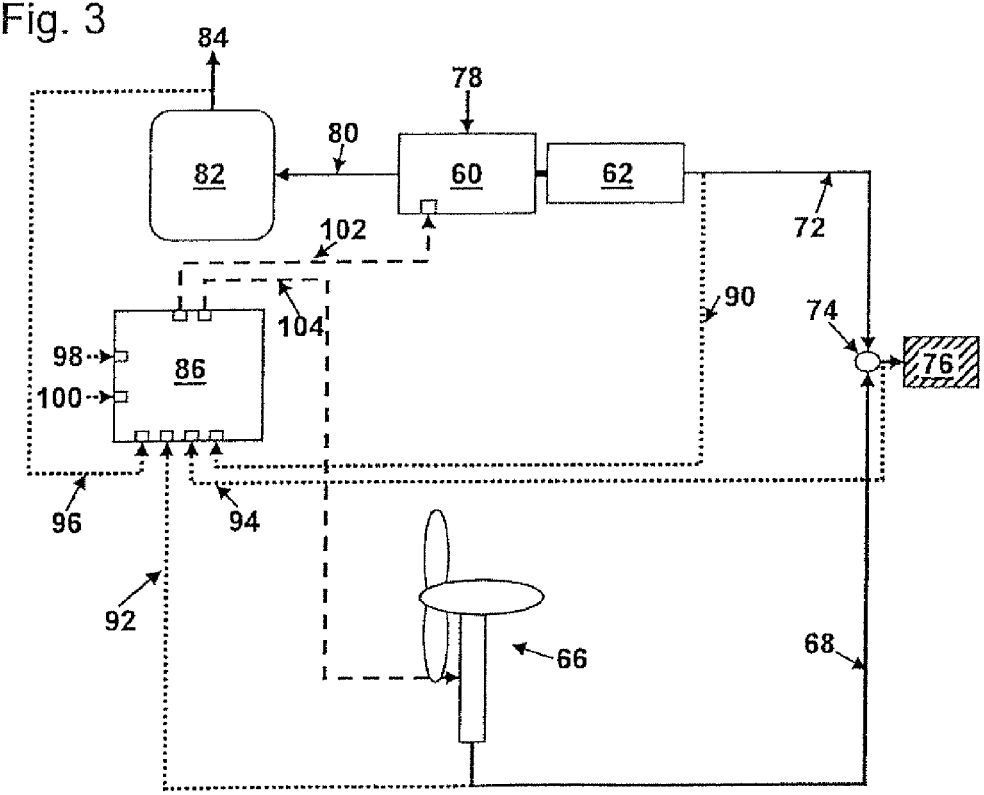

A further variant of the control will be explained by means of FIG. 3. In the depicted example of realisation, a wind energy installation 66 is envisioned as the sole additional energy converter. The elements denoted with the same reference numerals correspond to those of FIG. 2. In difference to FIG. 2, the control element 86 of FIG. 3 contains a second desired value presetting 100, which describes the demanded thermal power of the consumer(s) 84. Furthermore, via the connection 96, the control element 86 obtains information about the thermal power extracted from the heat accumulator 82. Upon increased demand for thermal power, the control element 87 can increase the power of the micro gas turbine correspondingly, so that a sufficient amount of heat is supplied to the heat accumulator 82. In case that the electric power of the generator 62 increases thereby in excess of the amount that is demanded in the mains grid 76, the excess electric power can also be supplied to the heat accumulator 82 via a corresponding heater element, as the case may be. Alternatively, via the control line 102, the control element 86 has the possibility to influence the provided electric power by a power decrease of the wind energy installation 66.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A hybrid installation for providing electric energy from regenerative energy sources, comprising a biogas installation that provides electric energy, and at least one additional energy converter (64, 66), which provides electric energy and whose releasable power is depending of external influence factors, of the wind supply and/or the sun irradiation in particular, wherein the electric energy of the biogas installation and the electric energy of the at least one additional energy converter are fed into a common mains grid (76), characterised in that the biogas installation features a gas turbine (60) with an electric generator (62) which is operated by the biogas produced in the biogas installation, and whose waste heat can be supplied to the biogas installation via a heat exchanger (20), wherein a control element (86) is provided which controls the gas turbine (60) in dependence of an internally or externally given desired value (98) for the electric power of the hybrid installation and in dependence of an additional internally or externally given desired value (100) for the thermal power of the hybrid installation.

2. A hybrid installation according to claim 1, characterised in that the biogas installation features a gas tank (14) for storing biogas.

3. A hybrid installation according to claim 1, characterised in that the gas turbine is a micro gas turbine (60) with an electric power of 100 kW or less.

4. A hybrid installation according to claim 1, characterised in that the overall electric power of the at least one additional energy converter (64, 66) is at maximum 50% of the electric power of the gas turbine (60).

5. A hybrid installation according to claim 1, characterised in that one of the at least one additional energy converters is a wind energy installation (66).

6. A hybrid installation according to claim 1, characterised in that one of the at least one additional energy converters is a photovoltaic installation (64).

7. A hybrid installation according to claim 1, characterised in that several additional energy converters (64, 66) are provided which use different regenerative energy sources.

8. A hybrid installation according to claim 1, characterised in that the additional energy converters are connected to a common DC circuit (18) or to a common AC circuit.

9. A hybrid installation according to claim 8, characterised in that the common DC circuit (18) or the common AC circuit, respectively, are connected to an electric energy storage device (20).

10. A hybrid installation according to claim 8, characterised in that an inverter (22) converts electric energy from the common DC circuit (18) into AC voltage and feeds it into the mains grid (76).

11. A hybrid installation according to claim 8, characterised in that the electric energy from the common DC circuit is fed into the mains grid (76) via a transformer.

12. A hybrid installation according to claim 1, characterised in that the heat exchanger (26) is connected to a heat accumulator (82) via first thermal transfer fluid circuit (28).

13. A hybrid installation according to claim 12, characterised in that the heat of the heat accumulator (82) can be extracted via a second thermal transfer fluid circuit (46).

14. A hybrid installation according to claim 12, characterised in that the biogas installation features a digester (10), which is equipped with a heating circle (32) that can be connected with the first thermal transfer fluid circuit (28) via a valve arrangement (30).

15. A hybrid installation according to claim 1, characterised in that the heat accumulator (82) features a heater element (48), which can be operated with electric energy from the at least one additional energy converter (64, 66).

16. A hybrid installation according to claim 15, characterised in that the control element (86) acquires the electric power of the generator (62) of the gas turbine and/or the electric power of each one of the at least one additional energy converters (64, 66) and/or the thermal power extracted from the heat accumulator (82).

17. A hybrid installation according to claim 15, characterised in that the control element (86) controls the electric power of one of the at least one additional energy converters (64, 66).

18. A hybrid installation according to claim 1, characterised in that the at least one additional energy converter (64, 66) and the biogas installation can be upgraded in a modular way.

19. A hybrid installation according to claim 1, characterised in that a gas treatment installation is provided and treated biogas is fed into a mains grid for gas.

20. A hybrid installation according to claim 19, characterised in that only a part of the produced biogas is utilised as a fuel for the gas turbine (60), wherein this part is dimensioned such that the electric and/or thermal energy provided by the hybrid installation is sufficient for the autonomous operation of the gas treatment installation.

21. A hybrid installation according to claim 19, characterised in that the biogas installation provides substantially more biogas than is required for the autonomous operation of the gas treatment installation.

22. A hybrid installation according to claim 19, characterised in that gas in a fuel- or thermal equivalent to the biogas that is fed is extracted from the gas mains grid at an arbitrary other location, and is supplied to a gas turbine or an internal combustion engine or to a gas extraction station there.

23. A hybrid installation according to claim 1, characterised in that the biogas installation features a fixed-film digester.

* * * * *